United States Patent [19]
Mock et al.

[11] Patent Number: 6,062,072
[45] Date of Patent: May 16, 2000

[54] DEVICE FOR MONITORING THE AIR PRESSURE OF PNEUMATIC TIRES OF VEHICLES

[75] Inventors: Markus Mock, Uster; Ernst Vollm, Kilchberg, both of Switzerland

[73] Assignee: Dynatron AG, Zurich, Switzerland

[21] Appl. No.: 09/011,288

[22] PCT Filed: Aug. 9, 1996

[86] PCT No.: PCT/EP96/03545

§ 371 Date: Apr. 10, 1998

§ 102(e) Date: Apr. 10, 1998

[87] PCT Pub. No.: WO97/06968

PCT Pub. Date: Feb. 27, 1997

[30] Foreign Application Priority Data

Aug. 11, 1995 [DE] Germany ............................ 195 29 623
Sep. 6, 1995 [DE] Germany ............................ 195 32 914

[51] Int. Cl.[7] .................................................. B60C 23/02
[52] U.S. Cl. ............................ 73/146.5; 73/146.2; 73/146
[58] Field of Search ............................. 73/146.2, 146.3, 73/146.4, 146.5, 146.8

[56] References Cited

U.S. PATENT DOCUMENTS

| | | | |
|---|---|---|---|
| 4,319,220 | 3/1982 | Pappas et al. ............................ | 340/58 |
| 4,734,674 | 3/1988 | Thomas et al. ............................ | 340/58 |
| 5,612,671 | 3/1997 | Mendez et al. .......................... | 340/447 |
| 5,717,135 | 2/1998 | Fiorletta et al. ....................... | 73/146.5 |
| 5,731,516 | 3/1998 | Handfield et al. ...................... | 73/146.5 |

FOREIGN PATENT DOCUMENTS

| | | |
|---|---|---|
| 0445003 | 9/1991 | European Pat. Off. . |
| 2441502 | 6/1980 | France . |
| WO 90/12474 | 10/1990 | WIPO . |
| WO 93/16891 | 9/1993 | WIPO . |

*Primary Examiner*—Benjamin R. Fuller
*Assistant Examiner*—Abdullahi Aw-Musse
*Attorney, Agent, or Firm*—Pearne, Gordan, McCoy & Granger LLP

[57] ABSTRACT

A device for monitoring the air pressure of pneumatic tires of vehicles having a pressure measuring system arranged on the vehicle wheel, the measured values of which are transmitted by means of a transmitter to a receiver, whereby each vehicle wheel is preferably associated with a receiver. The transmitters have a transmitting antenna which is fixed in relation to the wheel and is not integrated into the transmitter. The transmitter is preferably an antenna with several windings which are vulcanized in the side flanks or into the tread of the tire.

30 Claims, 3 Drawing Sheets

DEVICE FOR MONITORING THE AIR PRESSURE OF PNEUMATIC TIRES OF VEHICLES

The present invention relates to a device for monitoring the air pressure in the air chambers of pneumatic tires of motor vehicles, especially those as used in personal automobiles and trucks, whereby the invention can also be used in all other pneumatic tires.

WO 93/16891, published Sep. 2, 1993, discloses a control unit for measuring the air pressure of pneumatic tires of vehicles, in which a pressure measuring system is arranged in each wheel which detects the pressure of the tires and, via a transmitter also arranged in the tire, transmits the corresponding measured pressure value. This signal is received by a receiver, arranged in the immediate vicinity of the wheels, and then processed further. Alternatively, the use of a central receiver is also possible, which detects the signals of all the tires of the vehicle.

The pressure measuring system transmits the pressure measuring signal in intervals, whereby a respective identifying signal is also simultaneously transmitted, on the one side to ensure that only the value of its own vehicle will be received and not, for example, transmitter signals sent from a coincidentally nearby stopped vehicle, and to further ensure that the signal sent will unequivocally reflect the position of the respective tires. To provide the necessary electrical power needed by the transmitter, a lithium battery is utilized which rotates with the tire.

It is the object of the present invention to create a device for monitoring the tire pressure of pneumatic tires in which the assembly is simpler in comparison to other known devices, which is comfortable for the user, and which is reliable to operate.

This object is solved according to the invention by subject matter of claim 1.

Preferred embodiments of the invention are the subject matter of the depending claims, The present invention provides an antenna, which is in electrical connection with the transmitter but not integrated therewithin.

In this way, it is possible to improve the electromagnetic transmission of the signal and especially its efficiency.

In a first configuration of the invention, the antenna is integrated in the tread of the vehicle's tires. Especially preferred is providing several windings which are arranged next to each other along the circumference. According to a further configuration, the antenna is integrated into the side flank of the tire. Also in this case, a multitude of neighboring windings is preferable.

In this manner, the position of the antenna can be allotted to the inner side of the wheel as well as to the outer side.

In the above configuration examples, the transmitter can be fixed preferably in relation to the tires and not in relation to the rim. The transmitter will then be preferably integrated into the tire sidewall or into the tread. Integration, in this case, refers to preferably vulcanization, also in regards to the antenna.

In addition to the possibility of vulcanizing the antenna and, if necessary, also the transmitter in the tire sidewall or the tread, the possibility also exists of fixing the antenna directly on the tread or on the side flank of the tires. By the term "fixing," in this case, several different possibilities for affixing are meant, especially the possibility of adhering the antenna onto the tires. Further to the term "affix," however, also fixing the antenna in relation to the tread or the side flanks is possible, in which terminal force and especially elastic force is used to hold the antenna in a predetermined position. In this configuration, additional holding arrangements are preferably provided, which provide for fixing the antenna in relation to the tire contour and the tire circumference. Also in this case the transmitter is preferably fixed in relation to the tires, meaning that the position of the transmitter is fixed through the position of the antenna in the tires and not through a position in relation to the rims. It is therefore not required to bring the transmitter into a precise position in relation to the rim.

In another configuration, the antenna is integrated into the tire rims, whereby also here the integration in the rim beds or the integration in the side flank comes into consideration. With one rim it is also possible to wind the antenna right on the rim bed itself.

The above configurations have the advantage that an antenna coil is available which allows the dependable transmission of signals in the radio wave band with a high degree of efficiency. Furthermore, there is a further advantage in that the antenna is arranged rotationally symmetrical and concentrically to the vehicle tire, its position relative to the receiver, not, or only negligibly, effected by the turning of the wheel, for example by impacts to the front wheels or by sudden jolts to the front or rear wheels. When, on the other hand, the antenna is, for example integrated into the tire valve, the position of the antenna also changes with each turn of the tires, which can lead to interference in the transmission and which can especially lead to reduced efficiency of the entire transmission.

With the antenna arrangement of the present invention, the transmission efficiency is especially high, so that it is possible to transmit the electrical energy from the vehicle to the rotating wheel, whereby, in this case, the transmitter to receiver is arranged. The energy will be stored there, for example by means of condensers, and then used to measure the pressure, and transmit the acquired pressure signal without wires to the receiver. This configuration has the advantage that the transmitter does not require a battery. Thus, it is possible that the transmitter can be arranged in such a way in the rim, and especially in the tire itself, that providing an accessibility for the purposing of changing batteries is not required.

Through the special arrangement of the antenna, the so-called pairing mode, meaning the pairing with individual transmitters to one receiver, respectively to one specific tire position, will also be simplified.

In the described method according to WO 93/16891, the pairing occurs in that the transmitter receives a pairing signal and after receipt of the pairing signal, stores the associated address, whereby sending out of the pairing signal is triggered through a specific event and, on the other hand, the subsequent pairing has to be confirmed by the user. According to the inventive device, an external event, for example an increase or decrease from the transmitter's measured air pressure can likewise be used for the purpose of triggering a pairing mode. Additionally, a pairing mode is nevertheless made possible which functions automatically without input from the user. In this pairing mode, a pairing signal from the transmitter with the respective address is emitted in predetermined time intervals, for example always after a predetermined number of air measurements or in predetermined time intervals. The transmitter recognizes this pairing signal and compares the pairing signal of the received identification signal with the identification signal stored in the receiver. When the signals are identical, no pairing mode will be initiated. When the signals differ from each other, the receiver checks, on the basis of a program stored within itself, how often the signal was received. Simultaneously the receiver also preferably checks if the vehicle was moving during the measuring process. If it is determined that the same pairing signal was received for a long continuous period of time, its respective identification signal will be stored in the memory of the receiver. To increase the security even further, the receiver can further check if between the individual pairing signals sent, air pressure signals show the identification signal, which is stored as the old identification signal in the receiver. If this is the case, the new identification signal will not be stored.

The above described pairing process has the advantage that the pairing is automatically implemented without operation of a control switch device or similar device. This means that the pairing can also be implemented when the user, for example, changes from summer tires to winter tires and forgets to appropriately pair the arrangement. The process can, as a matter of course, also be used as a single pairing process without additional control switches or similar devices being necessary. The fact that the signals have to be repeatedly received and that, besides, a movement of the vehicle is preferably required, ensures that randomly received signals, for example from a neighboring stopped vehicle, will not be stored as an identification signal.

Only as a precaution will it be pointed out that the entire pairing process as described above with its different modifications can also be applied to arrangements for monitoring tire pressure, said arrangements showing another antenna arrangement as the present invention arrangement, for example arrangements in which the antenna is integrated into the transmitter and, for example, affixed to the valve.

In the present inventive arrangement, the antenna represents preferably an inductivity, meaning a coil, and is switched together with a capacitance to an oscillating resonant circuit. The coil is formed in a preferred manner of an electric leading wire laid down in adapted form as antenna in one of the tires. In this way, the rim, respectively the tires themselves, both objects being of essentially rotationally-symmetric form, envelop the coil.

It has been found out that by one of the invention's preferred transmissions of the measuring signal, in radio waves under 50 kHz, ten windings are sufficient for the signal to be transmitted with good quality from the transmitter in the tire to the respective receiver.

The receiver's antenna will be formed preferably in a similar manner as the antenna in the transmitter and, for example, as a coil in the area of the disc brakes with a diameter that is arranged preferably somewhat larger as the disc brake. In this way, the transmitter and receiver antennas neighbor each other and are arranged concentrically to each other, which results in an especially good and reliable signal transmission.

It is also possible, and within the teaching of the present invention, to use a high frequency signal for the signal transmission, for example, in the industrial frequency band from several hundred MHz, for example in the range of 400 to 500 MHz. In this case, the antenna can also be formed as a dipole. The use of such a high frequency has, however, also a large number of disadvantages, among which is especially the problem of the electromagnetic compatibility with other components of the vehicle.

Transmissions with a lower frequency, especially preferable in a range between 5 and 15 kHz and highly preferred in a range between 8000 and 10,000 Hertz, have the distinctive advantage that a greater directional efficiency is achieved and that the danger from interference from or through other devices is diminished by far.

It is judicious, on the basis of the transmission characteristics, to use an associated receiver on each tire. This, at first look, raises the expense for the device as a whole, but has, on the other hand, the advantage that it is easier to effect the arrangement of the wheel position with the respective receiver position than it is, for example, with a high frequency signal transmission where only one receiver is provided.

Further advantages, features and application possibilities of the present invention can be seen in the description of preferred embodiments in connection with the drawings. These show:

FIG. 1 a schematic representation of an configuration example of the inventive device for monitoring the air pressure of pneumatic vehicle tires;

FIG. 2 the arrangement of the antenna in the tread of a tire;

FIG. 3 the arrangement of the antenna on the wheel outer side of a tire;

FIG. 4 the arrangement of an antenna on the wheel inner side of a tire;

FIG. 5 a torus-shaped antenna;

FIG. 6 an antenna of cylindrical form;

FIG. 7 an antenna of disk-shaped form;

FIG. 8 a schematic side view of a further configuration example of the inventive device;

FIG. 9 a side view representation of a support arrangement for use with an configuration example according to FIG. 8;

FIG. 10 the support arrangement according to FIG. 9 in a frontal view;

FIG. 11 a detail of a further configuration example of the invention device shown in a schematic side view;

FIG. 12 a sectional representation of a further configuration example of the invention;

FIG. 13 a schematic side view of the configuration example according to FIG. 12, and FIG. 14 a further configuration example of the invention device.

A first preferred embodiment will now be described in relation to FIG. 1 and 2.

FIG. 1 shows a schematic representation of a device for monitoring the air pressure of pneumatic tires, similar to that described in WO 93/16891 in reference to this figure and in reference to the therein represented FIGS. 1 to 5. The description of this configuration example of WO 93/16891 (File No: PCT/EP93/0452) is included in this reference and in the disclosure of the present patent application, and in particular the distinct description of the figures from page 11, line 26 through page 23, line 28.

The configuration example shown in FIG. 1 shows the inventive device in the arrangement for a vehicle with four wheels, whereby each wheel is comprised of a metal rim (of course it is also possible and conceivable that a rim could, for example, be made of CFK), as well as a tire attached thereto. It is inconsequential for the structure and the function of the device if a so-called tubeless tire or a tire with a tube is considered.

The vehicle shows four wheels R1, R2, R3, R4, on which each a transmitter S1, S2, S3, S4 is arranged and which revolves with the tires.

Furthermore, four receivers E1, E2, E3, E4 are provided, each respectively arranged to a single corresponding transmitter. The structure of the transmitter is discussed in detail in WO 396 016 891 in reference to FIG. 2; the structure of the receiver is detailed in WO 93/1689 in reference to FIG. 5.

A short summary comprises the transmitter of an air pressure measuring system, which preferably has a piezoelectric-type pressure sensor, said sensor transforming an analog exit signal over a signal processing switch by means of an A/D-transformer into a digital signal. The digitally processed signal is fed to a microprocessor counter unit which is connected to a memory. To control the time intervals, a time relay is provided.

The memory is provided with a ROM- and a RAM-memory and contains a program to control the transmitter. The send signal is emitted over a signal processing switch and then the antenna with a frequency from approximately 8900 Hertz, whereby this emission takes place in intervals which are set forth by the time relay. Each signal emitted, as is shown in FIGS. 3 and 4 of WO 93/16891, contains a preamble of 16 bits, an identification symbol of 32 bits, a data signal is demodulated which contains the pressure value, and a postambel of 4 bits.

Each of the receiving sections has an antenna, which signal is assigned to one signal processing position where the signal is increased and filtered. Then the signal is demodulated in a demodulating step and is sent as a digital signal to a microprocessing unit.

A micro processing unit can be used for the receiving sections, and is then arranged in the central control unit Z and which then receives the signals as digital from all the receivers, or each receiver can be provided with a digital signal processing microprocessor means, which central control unit Z then only delivers the corresponding pressure values and wheel position information for the respective tire.

The tire pressure data is indicated to the driver on a display A or, alternatively, shown for a brief period of time after the start of the vehicle, in order to confirm that the arrangement is in working order, and is then only shown when the tire pressure of one of the tires varies below or above a predetermined basic value.

In contrast to the arrangement according to WO 93/16891, the present invention provides an antenna, which is directly integrated into the tread of the tire. FIG. 2 shows a tire 20, in which the antenna 21 is arranged in several windings parallel to each other. The antenna is comprised of an electrically insulated wire. The antenna is preferably vulcanized directly into the tire tread, whereby when then the tire material possesses a corresponding electrical resistance value, it will not be necessary to apply electrical insulation, at least within the vulcanized area.

The transmitter, which can be formed very small is, in this configuration example, likewise vulcanized into the tread. It is also possible, however, to arrange the transmitter in the side flanks of the tire.

The vulcanization or affixing of the transmitter in the tire tread nevertheless has the advantage that the tread is less stressed during fitting as the side flanks are, so that the mechanical strain during fitting is lower. On the other hand, the centrifugal forces at work and also those on the receiver have an increased effect when the tread serves as carrier for the receiver.

It is likewise possible to arrange the receiver in a stationary position in the wheel rim. In this case, however, care must be taken that the tires can shift relative to the rim.

This can occur when a correspondingly long supply cable is arranged from the antenna to, for example, a transmitter which is affixed to the valve hole. It is however likewise imaginable that a contact is arranged on a tire, which is in electrical contact via a contact strip on the rim, whereby the contact with the rim and the contact strip with the transmitter are also connected. In this case, the signal will be transmitted also during a displacement of the tire.

The receiver antenna can be a conventional antenna coil. Or, alternatively, a receiving antenna with several windings which are arranged concentrically to the wheel and, for example, provided in the area of the disk brakes, can also be used. This arrangement guarantees an especially good energy transmission.

The inventive device according to the first configuration example has a large number of production variations which will be discussed in brief in the following:

In the first version, a time relay unit is integrated in the transmitter for the purpose of ensuring that the send signal will be emitted in predetermined time intervals, as is described in WO 93/16891. The receiver receives the signal and conveys it further to the central control unit Z, where it is further processed and, if necessary, sent to the display. Especially preferred, in addition to periodic inquiries, is a monitor such as monitors M1, M2, M3 and M4 provided in transmitters S1, S2, S3 and S4, respectively, provided in the transmitter which switches the send block transmission unit from a stand-by mode into an active-send mode when the pressure in the tire drops by a pressure gradient which falls outside of a predetermined value. In this way, transmissions can be made, for example, every five or every ten minutes, with the central control unit Z checking in each case whether signals from all four tires are submitted and whether these signals correspond to their predetermined values. If a pressure drop arises between measurement cycles, the unit in the corresponding tire recognizes this and issues an alarm signal to the central control unit Z. This, in turn, further leads to the driver being warned either audibly or visually via the display A.

In this way, even a rapidly occurring pressure drop inbetween measurement cycles can be identified quickly and dependably.

In this first version, the identification signal, which identifies the position of the individual transmitters, is stored in the transmitter and in the corresponding receiver respectively When new tires are mounted, the central control unit and the individual receivers will be switched over into a pairing mode. The device then receives the corresponding respective signal, and stores the identifications signal contained within. In order to be able to transmit the signal, each receiver E1 to E4 is equipped with an identifications control signal, which in a corresponding pairing attempt, likewise contains the identification control signal, which recognizes the corresponding transmitter and stores the corresponding identification signal in the respective receiving unit.

In a second version each transmitter sends out identification control signals and their identification signals at regular time intervals. These identification control signals are received from the corresponding receivers. After a predetermined number of identification control signals with the same identical signal have been received, the receiver recognizes that the signal originates from the corresponding transmitter and stores the simultaneously-transmitted identification signal in the corresponding memory of the receiver. In this way, transmitters and corresponding receivers are paired, without the need for a manual switch over or any input from the user.

A third version functions equivalently to the second version. Except here, the corresponding receivers also check, in addition, whether the vehicle is in a moving state. An identification takes places only when the vehicle is moving and identification control signals with the new identification signal are being regularly received.

In a fourth version, which can be combined with the third version, the receiver regularly checks whether the corresponding identification signal received up to that point is still being continually received. If the identification signal is no longer being received, the receiver sends a corresponding signal to the central control unit, which in turn sends a signal to the user via the display, informing him that the signal is no longer being received. This notice is preferably combined with an inquiry as to whether the respective tire has been changed. If this is confirmed by the user, the transmitted identification control signal inbetween the pressure signals is interpreted and the identification control signal transmitted signal is stored as the new identification signal in the respective receiver.

This fourth version has the advantage that although it does not function automatically, it can, however, establish that a tire change has actually taken place. If the identification or the transmitter is in any way not in proper working order, the user can tell from the display, if the tire has not actually been changed, that a malfunction exists.

A fifth version corresponds essentially to the second version. In this fifth version each transmitter sends out signals at regular time intervals, whereby these signals contain one identification signal of the respective transmitter, and the data, especially pressure and also preferably temperature. If a battery is used in the transmitter, a battery status signal can also be transmitted with the signal, which is also possible with all of the other versions as well. If a tire is changed, according to this version, as soon as the new tire is mounted, the receiver no longer receives the identification signal from the transmitter of the previously-used tire. Instead, a signal is received which contains the new identification signal. After a predetermined number of received signals, the new identification signal is accepted by the respective receiver, and associated with the respective tire position, on which the receiver itself, respectively the antenna of the receiver, is arranged. In doing so, preferably also the intensity of the received signal is judged in order to establish that the signal does not originate from another tire. Instead of judging the intensity of the received signal, the intensity of the transmitted signal in coordination with the respective antenna can also be selected, as the antenna range from the other tire positions is insufficient to be received. To reduce the possibility of error in the classification of tire position, it is nevertheless preferable to inquire of a threshold value of the signal intensity, in order to establish if it actually concerns the signal of the respective associated tire.

It is furthermore a large advantage of this design that it can be implemented in a service station after a change is effected to the outfitting of the vehicle's tires. In this version, the vehicle's ride does not have to be checked in order to avoid an error in identification through neighboring stopped vehicles.

In a sixth version, the transmitter is fabricated somewhat differently as has been previously described. Here, the transmitter possesses the additional possibility of also receiving signals. In this version, the transmitter always sends a signal forth when the receiver furnishes such an appropriate order to the transmitting unit.

If the tires are changed, according to this version, an input will then be entered, for example via the display, that a new identification must be assumed. The receiver then successively emits the identification control signal recognized and produced from the respective transmitters, with the transmitters for their part transmitting an identification control signal with its identification to the receiver.

Due to the high efficiency of the energy transmission, these six versions can also be modified as a seventh version and so used to transmit energy to the transmitter of the tire. In this case, electrical energy received through the antenna, for example in condensers, is stored and serves then as an electric supply for the transmitter. The transmitter then preferably always emits a signal when it is appropriately animated by the receiver. Additionally, with this variation, so much energy can be stored, that it is also furthermore possible for an alarm signal to be generated by a sudden drop in pressure.

The seven variations described above, relative to the different identification possibilities, can also be combined with variations 1 through 6.

In an eighth version, which likewise can be combined with the preceding described versions (as far as it is technically feasible), an automatic correlation of the identification signal is likewise associated to the tire position. Also in this case, individual receivers are arranged near each tire, or at least antennas are arranged, connected with the receivers. Additionally here, however, a sensor is provided which detects when a tire change takes place. The signal of this sensor is conveyed to the individual receiver or to the entire system, respectively the control unit, so that the respective device subsequently possesses the information that an identification has to take place.

Various possibilities come into consideration for the sensors. What is simplest is providing a micro switch or similar device which ascertains when the tire is detached from the tire hub or when, for example, a tire screw comes loose. Such a sensor can be very easily arranged, although the disadvantage here is that the tire hub and its fortification rotate with the tire.

In order to receive information about a tire change, however, the sensors can also be arranged on sections of the vehicle body which do not rotate, and especially on sections of the wheel suspension. During a tire change, the wheel has to be, in any case, rendered free of stress in full circumference, whereby also the wheel suspension, comprising individual steering components, shock absorbers, springs, etc. is rendered free of stress. With a force (Kraft) sensor, the overload on, for example shock absorbers, can be measured and it can be established that the shock absorber is overburdened. The use of such a sensor has the advantage that with vehicle bodies containing electronic controls, the stabilizing characteristics are provided in the vehicle anyway.

Alternatively, a micro switch can also be utilized, which is in connection with a spring or with another part of the suspension, and is so arranged that it is actuated when the respective part of the suspension moves due to a release into an unburdened position. That such an unburdening can also be suddenly caused through the kinetic changes to the vehicle during its operation, is it advisable that the sensor signal is observed over a longer period of time, for example, several seconds or minutes, in order to ascertain whether it actually is the case of a statistical release of stress. Alternatively, it can also be checked whether the vehicle is in a state of movement, an information which is available anyway through the vehicle's appropriate sensors, for example the tire sensor of an ABS-arrangement.

A further arrangement of the antenna, which can be utilized in the same manner in all the above-mentioned variations as the configuration example according to FIG. 2, is shown in FIG. 3. Here the antenna is integrated in the side flank of the tires, whereby the individual windings are not placed adjacent each other, but rather lie in virtually concentric or spiral-formed rings over one another. Also here a correspondingly formed concentrically arranged antenna is advantageously utilized for the receiver.

FIG. 4 shows an appropriate antenna design, whereby here the individual windings are arranged in the wheel inner side and are vulcanized into the tire tread.

Various forms of affixing the antenna on the wheel or in the wheel or on the rim are shown in FIGS. 5, 6 and 7.

In FIG. 5, several antenna windings are covered by a tube, which, for example, can be wound on a rim.

A further configuration example of the inventive device will now be described in relation to FIGS. 8 to 10.

In this configuration example, the antenna is comprised of elastic wire, which is either itself electrically conductive, for example comprised of steel or copper or similar material, or at least contains an electrically conductive element. This can be, for example, a plastic wire-like rod or a plastic pipe which contains an electrically conductive cable. Fundamental to this configuration example is the capacity for elasticity.

The so-defined wire is coiled up in a spiral fashion in the tire and has, due to its elastic properties, the tendency to increase the diameter. This thereby produces an outwardly-directed compressed force which conforms the wire to the inner side of the tire tread. The spiral contains, preferably, eight or more windings.

Through its elastic properties, the so-formed spiral will be held in the tire without any other further support being necessary. The installation is likewise especially simple since for the installation the spiral merely has to be reduced to a smaller circumference, allowing the spiral to be placed in the tire, whereupon due to its elastic ability, it then expands and conforms to fit into the tread.

Figure 1:
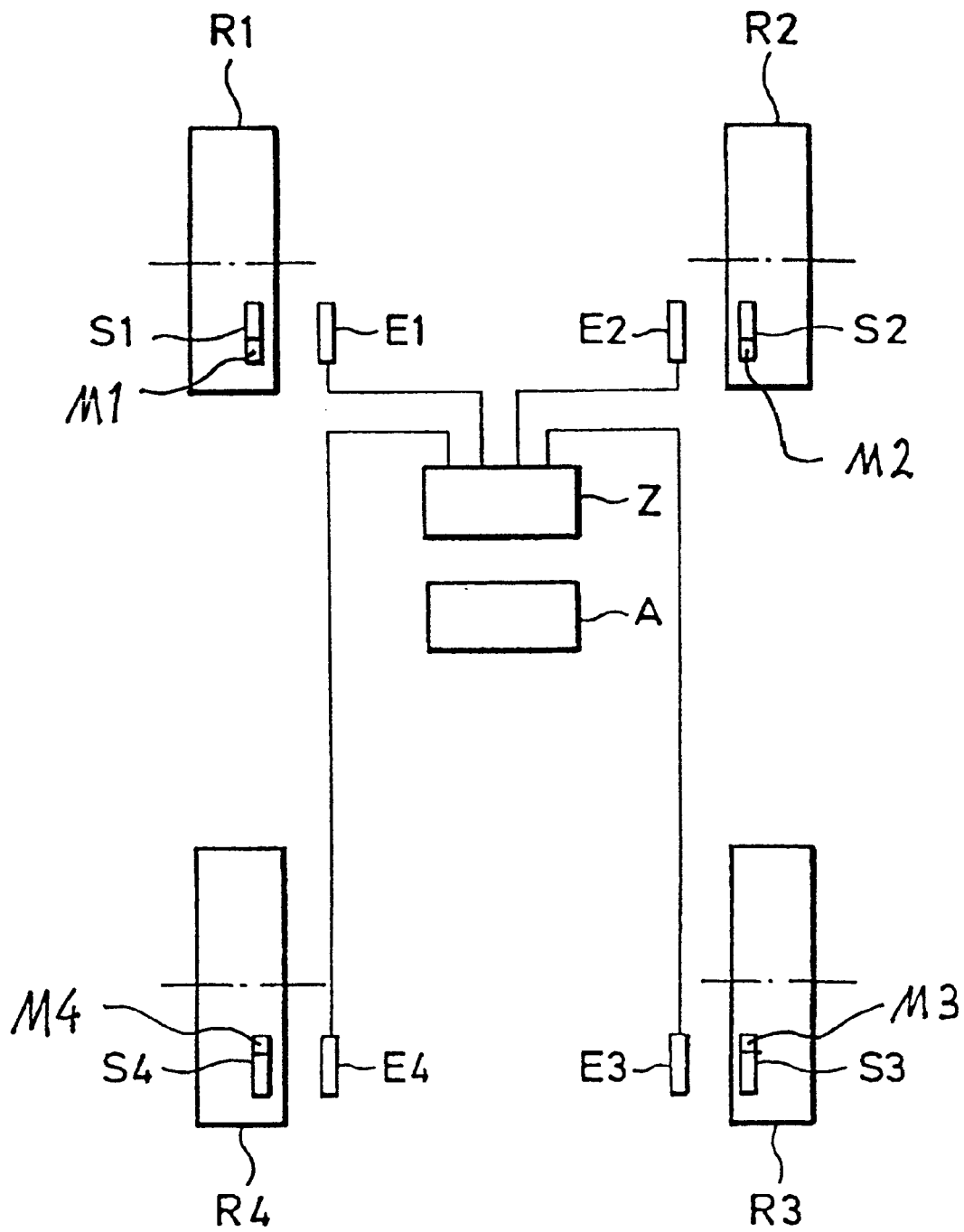
Figure 2:
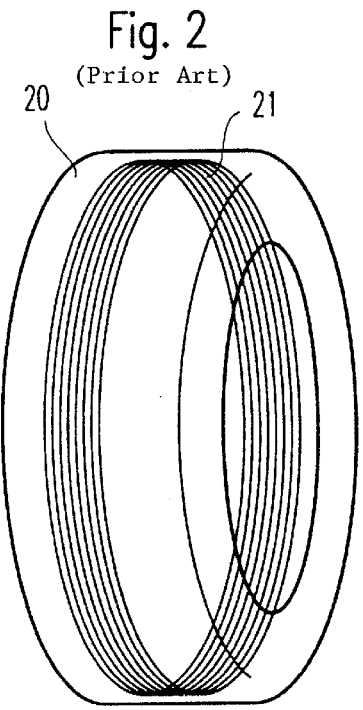
Figure 3:
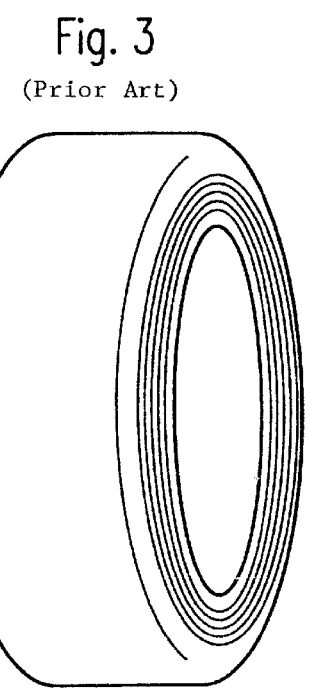
Figure 4:
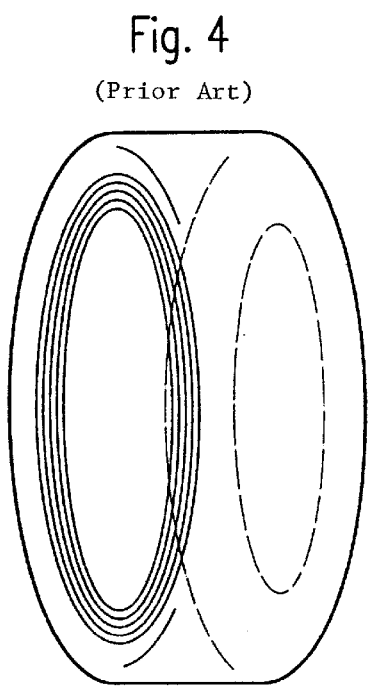
Figure 5:
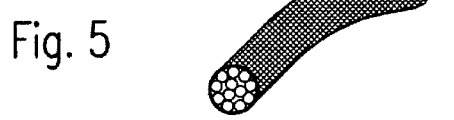
Figure 6:
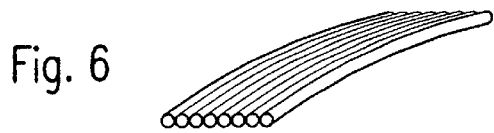
FIG. 6 shows a cylindrical arrangement of windings arranged adjacent to one another, which can likewise, for example, be wound on a rim.
Figure 7:
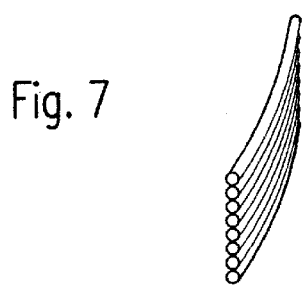
FIG. 7 shows finally a disk-formed arrangement, as can also be used in the arrangements according to FIGS. 3 and 4, and which, for example, can be affixed to the side flank of a rim.
Figure 8:
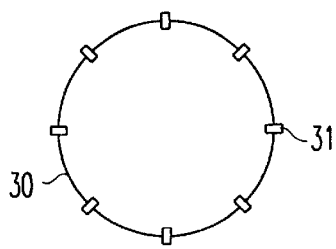

In the case of an uninsulated electrically conductive wire being used as a spiral, or in the necessity of precisely affixing the spiral relative to the tire tread, additional connection and support elements can be utilized in regular intervals, as is shown in FIG. 8. FIG. 8 shows the coiled spiral 30 in a side view with connection elements in regular intervals, said connection elements designated 31.

Figure 10:
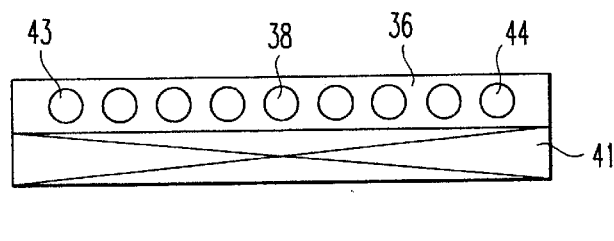

The connection element is preferably comprised of long, round or square plastic bodies in which an adjacent row of bores is arranged, similar to the representation of the lateral bar 36 in FIG. 10.

Figure 9:
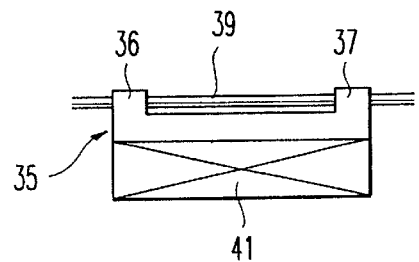

FIGS. 9 and 10 show a support element for connection with the antenna shown in FIG. 8, which is provided to connect a transmitter with the antenna.

In this case, the support element is likewise composed of a plastic body 35 which is formed in an essentially rectangular shape and has a first lateral bar 36 and a second lateral bar 37. In lateral bars 36 and 37 a row of bores 38 is provided through which the elastic wire 39 is extended. In the configuration example, a total of nine bores are provided, so that the spiral can have nine windings.

The transmitter 41 is, as schematically represented, affixed to support element 35. Said affixing follows in such a manner that the transmitter is connected with the beginning and the end of the spiral-formed antenna. This can occur in a simple manner in that first bore 43 and second bore 44 in support element 35 remain in electrical contact with the transmitter.

Instead of the support element 35, the ends of the spiral can also be provided with a further appropriate element, for example with a loop that allows the transmitter to be mounted on the spiral.

Such a loop or appropriate element, which allows the transmitter to be affixed to the antenna, can then also be utilized when the antenna is vulcanized into the tread or onto the side flanks of the tire. In this case, the antenna is so formed and the vulcanization process controlled in such a manner that the fixing arrangement, for example the loop, protrudes in a direction inwardly from the rubber after the vulcanization.

The length of the wire and therefore the length of the spiral does not have to be precisely selected since both ends of the wire lie exactly within a support element. The end of the wire can, rather, hang over the respective support element, virtually resulting in an open end of the antenna. This design also has the advantage that the length of the wire does not have to fit exactly to the inner diameter of the tire. It is therefore possible to use one and the same spiral-formed antenna with tires of differing diameters.

The advantage of this configuration is that the antenna and transmitter can be incorporated into the tires without requiring any modifications to the tire or the rim. That the fitting finally only consists of extending the spiral-formed antenna, it is especially easy and quick to implement. Also replacement of a defective device can follow without problems as there are no difficulties during tire mounting or demounting.

Figure 11:
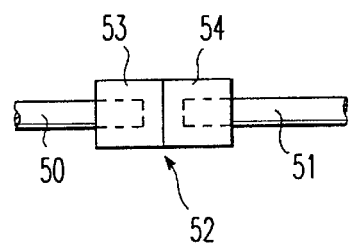

An alternative configuration of such a spiral-formed antenna is shown in FIG. 11. The antenna is likewise here comprised of a wire in the above-defined sense. The wire here is, however, not wound as a spiral coil, but rather comprised from individually separated rings, which are formed in such a way that they tend to occupy a smaller diameter. The ends 50, 51 of each ring are inserted or fixed in a connection element 52 which is comprised of a plug component 53 and a second plug component 54. Each plug component 53, 54 is so designed that eight or more rings 50, 51 can be received parallel to another.

The plug connection element 52 contains elements to electrically connect the individual rings 50, 51 with each other, so that an electric coil develops.

The individual rings 50, 51 are in this way under tension, so that they tend to occupy a smaller diameter as that of the inner diameter of the tire. On the other hand, the length of the rings are determined in such a way that the outer diameter of the rings is in a state of tension, meaning a condition in which the plug connections 53, 54 are connected with each other, showing an outer diameter which is negligibly larger than the inner diameter of the tire.

For fitting, the plug connections 53, 54 are disengaged, whereby the antenna, due to its elasticity has a diameter which is smaller than the smallest inner diameter of the tire. In this way, the antenna can be easily inserted in the tire. Inside the tire, the antenna is then extended and the plug connections 53, 54 connected. Due to the difference in diameters, a tension is exerted on the antenna through the tire inner wall, ensuring a secure hold for the antenna in the tire.

The transmitter can be integrated in the plug arrangement 53, 54, and can also, nevertheless, be arranged in another location, preferably arranged 1800 to the plug arrangement.

Figure 12:
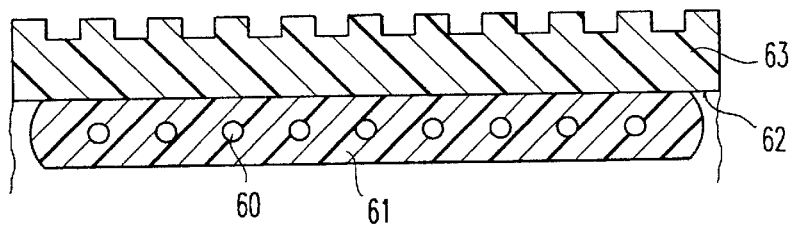
Figure 13:
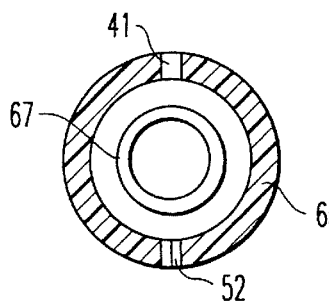

A further configuration example in FIG. 12 will now be described. This configuration example can be formed once as an outwardly-open spiral, as is represented in FIGS. 8, 9 and 10, or through an arrangement of individual rings, as is represented in FIG. 11. The individual windings of the antenna 60 are embedded here in body 61, which is laid on the inner wall 62 of tire 63. Collectively, this results in a cylindrical body 65, as is shown in the partial representation according to FIG. 13, which is fixed on the inner wall of the tire (not shown in FIG. 13), having, on the other hand, sufficient distance to a symbolically represented rim 67.

There are different design possibilities for this configuration example.

In a preferred embodiment, the antenna is designed according to the configuration example of FIG. 11, having therefore a plug connection element 52. The wires are embedded in a foam material 61, whereby this material, on the one hand, electrically insulates the individual windings from each other and, on the other hand, creates a distance between the antenna windings and the inner side of the tire flank. The individual wire rings of the antenna are so dimensioned that the elastic body 61 in the arrangement on tire 62 is, at the most, merely negligibly deformed.

This configuration has the advantage that although the antenna is fixed in relation to the tire, the connection between tire and antenna is elastic. Individual shocks, which are delivered through the tire treads, are stabilized relative to the antenna and the transmitter connected thereto. The elastic body can, for example, be made of foam rubber or a similar suitable material. Its thickness can measure, in radial direction of the tire, several centimeters, or also just several millimeters.

In another variation, the body 61 itself is non-elastic or only negligibly elastic and serves solely to hold the antenna in the spiral. In this case, the elastic support strength of the ring or of the spiral in the tires is delivered exclusively by the steel wire. In this configuration, an adhesive connection can also additionally or alternatively be provided between the tread and the body 61.

Figure 14:
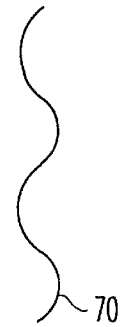

FIG. 14 shows a modification in relation to the described configuration examples in FIGS. 8 through 13. While it is a given that the individual wires run along an essentially exact geometric circle in the above configuration example, here the wires 70 are curved in the form of a sinuous line in a circumferential direction or a radial direction to the tires. Alternatively to a sinuous line formation, other contorted forms can also be considered. A wire design such as has the advantage that the elastic support strength of the spiral or the rings in the tires is increased and that individual jolts on the wire through the tread do not lead to a substantial deformation of the wires nor to impairment of the elastic tension.

In a further variation, which can be used especially with the configuration according to FIG. 14, but also with the other configurations according to FIGS. 8 to 13, the elastic support strength is increased in that the tires are first filled to an air pressure which is clearly over the normal operating pressure. By doing so, the inner diameter of the tires is increased and the antenna adjusts to this inner tire diameter due to its elastic properties. The antenna is simultaneously designed in such a manner that a decrease in the diameter after fitting, especially through friction with support elements or similar, is made considerably more difficult. When the tire pressure is then reduced to its normal value, the diameter is also reduced, resulting in the antenna then having more elastic tension.

In all the above configuration examples, the antennas have the advantage that they are concentrically arranged to the center hub of the wheel. This means that the antenna, in respect to the electronics, also retains its position when the wheel rotates. In this way, the signal transmission remains independent from the respective position of the wheel. The latter is especially important when the receiver antenna likewise utilizes an antenna arrangement which is concentric to the center hub of the wheel.

This antenna design has substantial electrical advantages. That its position does not change through the rotations, allows for relatively long periods of time for signal transmissions. It is thereby possible to use radio signal transmission frequencies of under 50 kHz, said frequencies not causing interference with the normal electrical and electronic elements of the vehicle.

When the antenna is, for example, arranged directly on the valve, a very high frequency must be selected with some of the configuration examples in order to ensure that the entire signal transmission transpires very fast, so that the position change of the wheel as a result of its rotation does not influence the signal transmission.

What is claimed is:

1. Device for monitoring the air pressure in the air chamber of pneumatic tires of vehicles comprising:
    a pressure measuring system arranged on a vehicle wheel which registers the pressure in the air chamber of the tire and emits a representative electrical pressure signal for the pressure value;
    a transmitter arranged on a vehicle wheel which receives the issued pressure signal from the pressure measuring system and sends an appropriate pressure send signal out;
    a receiver arranged at a distance from a vehicle wheel which receives the signal transmitted by the transmitter;
    as well as an antenna which is not integrated in the transmitter, but rather while being in electrical connection with the transmitter, is arranged independently therefrom in the wheel,
    wherein said transmitter comprises a stand-by mode, in which said pressure send signal is sent out to said receiver at predetermined time intervals and
    wherein a monitor is provided in said transmitter which switches said transmitter in an active send mode when the pressure in the tire drops by a pressure gradient above a predetermined value.

2. Device according to claim 1, wherein the antenna is fixed in relation to the tread of the tire.

3. Device according to claim 1, wherein the antenna is fixed in relation to the tire side flanks.

4. Device according to claim 2, wherein the transmitter is affixed in relation to the tires.

5. Device according to claim 1, wherein a transformation device is provided which digitally encodes the transmitted signal from the transmitter.

6. Device according to claim 1, wherein the transmitter sends out an identification signal with the pressure signal which clearly identifies the pressure measurement system, and wherein the receiver recognizes this transmitted identification signal and wherein the signal is only then further processed, forwarded on to the central control unit respectively, when the received identification signal corresponds to a predetermined characteristic.

7. Device according to claim 6, wherein the identification signal is stored in the transmitter as a digital series of numbers with n bits and wherein the identification comparison signal in the receiver is likewise stored as a digital series of numbers with n bits.

8. Device according to claim 6, wherein the identification comparison signal stored in the receiver is variable in order to be able to adapt the identification signal and the identification comparison signal from the transmitter and the receiver unit to each other.

9. Device according to claim 1, wherein the transmission of the signals from the transmitter to the receiver occurs as carrier waves with electromagnetic waves (radio waves) at a constant frequency.

10. Device according to claim 9, wherein the frequency of the electromagnetic carrier waves is in the radio wave band.

11. Device according to claim 7, wherein the transmission of data results from a change in the phase position of a sine-formed carrier signal (phase shift keying).

12. Device according to claim 1, wherein the transmitter has a time relay unit and is controlled in this manner, wherein the pressure measuring system measures the pressure in predetermined, essentially fixed time intervals.

13. Device according to claim 1, wherein the transmitter has a detector unit which recognizes a transmitted signal from the receiver and which, upon the first occurrence of this signal, switches the transmitter from a passive stand-by-mode into an active send-mode so that a pressure measurement can be taken and the send signal emitted.

14. Device according to claim 13, wherein each of the pressure measuring and transmitter devices arranged on the vehicle wheel is associated with a receiver, whereby the signal received by the receiver is conveyed on to a central display device.

15. Device according to claim 6, wherein the receiver is connected with a switch device which controls the switching of the receiver from normal operating mode, in which the air pressure will be controlled, into a pairing mode, in which the receiver receives the identification signal of each transmitter and stores it as an identification comparison signal.

16. Device according to claim 15, wherein each transmitter has a detector device which recognizes the transmission of a predetermined switch signal and thereupon switches the transmitter into a pairing mode in which the identification signal and a shown pairing mode additional signal is emitted.

17. Device according to claim 1, wherein a temperature measurement device is furthermore provided on the vehicle wheel which detects the temperature in the air chamber of the tire, and wherein the transmitter receives the emitted pressure signal from the temperature measurement device and sends out the appropriate temperature signal, which is then received by the receiver and further processed.

18. Device according to claim 17, wherein an audio or optical warning is issued when the temperature in one of the tires exceeds a set value or when too large of a temperature discrepancy is ascertained between different tires of the same vehicle or between the tires and the outside environment temperature.

19. Device according to claim 1, wherein the antenna is formed as a spiral which is held in the tire by elastic force.

20. Device according to claim 19, wherein the antenna is comprised of individual rings which are connectable via a plug connection to an electrical coil and are fixed in the tires through elastic force.

21. Device according to claim 19, wherein the individual antenna windings are coated with an elastic body.

22. Method for use of the device according to claim 1 in pneumatic tires of a vehicle or machine selected from the group consisting of personal automobiles, trucks, self-driving machines and airplanes.

23. Device according to claim 2, wherein the antenna is secured to the tread of the tire.

24. Device according to claim 3, wherein the antenna is secured to the tire side flanks.

25. Device according to claim 4, wherein the transmitter is secured on the tread or side flanks of the tire.

26. Device according to claim 10, wherein the frequency of the electromagnetic carrier waves is between 4 and 100 Kilohertz.

27. Device according to claim 10, wherein the frequency of the electromagnetic carrier waves is between 4 and 50 Kilohertz.

28. Device according to claim 10, wherein the frequency of the electromagnetic carrier waves is between 4 and 15 Kilohertz.

29. Device according to claim 11, wherein the transmission of data results from a differential change in the phase position (differential phase shift keying).

30. Device according to claim 15, wherein the receiver is connected with a switch device which controls the switching of the receiver from normal operating mode, in which the air pressure will be controlled, into a pairing mode, in which the receiver receives the identification signal of each transmitter and stores it as an identification comparison signal with an association of the respective wheel position.

* * * * *

UNITED STATES PATENT AND TRADEMARK OFFICE
CERTIFICATE OF CORRECTION

PATENT NO. : 6,062,072
DATED : May 16, 2000
INVENTOR(S) : Markus Mock, et al.

It is certified that error appears in the above-indentified patent and that said Letters Patent is hereby corrected as shown below:

On the Title Page, Item [30] Foreign Application Priority Date, first application delete "195 29 623" and insert therefore --195 29 623.0--.

On the Title Page, Item [30] Foreign Application Priority Date, second application delete "195 32 914" and insert therefore --195 32 914.7--.

On the Title Page under Attorney, Agent, or Firm line 1 "Gordan," should be --Gordon,--.

Column 5 line 17 delete "is demodulated" and insert therefore --of 24 bits,--.

Column 6 line 36 after "tively" insert --.--.

Column 10 line 59 delete "1800" and insert therefore --180°--.

Column 13, claim 12 line 2 after "manner," insert --and--.

Signed and Sealed this

Seventeenth Day of April, 2001

Attest:

NICHOLAS P. GODICI

Attesting Officer

Acting Director of the United States Patent and Trademark Office